United States Patent
Chae et al.

(10) Patent No.: US 9,876,666 B2
(45) Date of Patent: Jan. 23, 2018

(54) METHOD AND APPARATUS FOR ACQUIRING SYNCHRONIZATION BY DEVICE-TO-DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/113,021

(22) PCT Filed: Jan. 26, 2015

(86) PCT No.: PCT/KR2015/000785
§ 371 (c)(1),
(2) Date: Jul. 20, 2016

(87) PCT Pub. No.: WO2015/111973
PCT Pub. Date: Jul. 30, 2015

(65) Prior Publication Data
US 2017/0005850 A1 Jan. 5, 2017

Related U.S. Application Data

(60) Provisional application No. 61/930,961, filed on Jan. 24, 2014, provisional application No. 61/989,506, filed on May 6, 2014.

(51) Int. Cl.
*G01R 31/08* (2006.01)
*H04L 5/14* (2006.01)
(Continued)

(52) U.S. Cl.
CPC ...... *H04L 27/2692* (2013.01); *H04L 27/2613* (2013.01); *H04L 27/2656* (2013.01); *H04W 56/001* (2013.01)

(58) Field of Classification Search
CPC . H04L 27/2694; H04L 27/2698; H04L 27/32; H04W 56/0025
See application file for complete search history.

(56) References Cited

U.S. PATENT DOCUMENTS 8,427,976 B1 * 4/2013 Dinan ............... H04W 36/0072
370/252
8,817,771 B1 * 8/2014 Zhao ................... H04L 27/2656
370/208

(Continued)

OTHER PUBLICATIONS

Broadcom Corporation "Synchronization Design for D2D Communication," 3GPP TSG-RAN WG1 #75, R1-135542, Nov. 2013, 3 pages.

(Continued)

*Primary Examiner* — Faruk Hamza
*Assistant Examiner* — Abu-Sayeed Haque
(74) *Attorney, Agent, or Firm* — Lee, Hong, Degerman, Kang & Waimey

(57) ABSTRACT

In one embodiment of the present invention, a method for acquiring device-to-device (D2D) synchronization by a terminal in a wireless communication system comprises the steps of: receiving a subframe; and detecting a D2D synchronization signal including a first synchronization signal and a second synchronization signal, from a plurality of orthogonal frequency division multiplexing (OFDM) signals of the subframe, wherein the terminal can determine a kind of an application related to the D2D synchronization signal from a symbol structure formed by an OFDM symbol through which the first synchronization signal is transmitted (Continued)

and an OFDM symbol through which the second synchronization signal is transmitted.

13 Claims, 15 Drawing Sheets

(51) Int. Cl.
| | | |
|---|---|---|
| *H04L 12/28* | (2006.01) | |
| *H04J 3/00* | (2006.01) | |
| *H04L 27/26* | (2006.01) | |
| *H04W 56/00* | (2009.01) | |

(56) References Cited

U.S. PATENT DOCUMENTS

2014/0126403 A1* 5/2014 Siomina ................ H04W 24/10
370/252
2014/0198694 A1* 7/2014 Yang .................. H04W 52/242
370/311
2015/0085834 A1* 3/2015 Liu ................... H04W 72/0446
370/336
2015/0181546 A1* 6/2015 Freda ................ H04W 56/0015
370/336

OTHER PUBLICATIONS

Nokia, et al., "D2D Synchronization and Transmission Timing," 3GPP TSG-RAN WG1 #75, R1-135591, Nov. 2013, 5 pages.

Ericsson, "Synchronization Signals and Channel Design for D2D Discovery and Communication," 3GPP TSG-RAN WG1 #75, R1-135903, Nov. 2013, 10 pages.

Etri, "On the D2DSS and PD2DSCH," 3GPP TSG-RAN WG1 #75, R1-135277, Nov. 2013, 7 pages.

Alcatel-Lucent , "Synchronization Design for D2D Communication," 3GPP TSG-RAN WG1 #75, R1-135175, Nov. 2013, 4 pages.

PCT International Application No. PCT/KR2015/000785, Written Opinion of the International Searching Authority dated Apr. 28, 2015, 22 pages.

* cited by examiner

FIG. 5
DM 1 / application 1
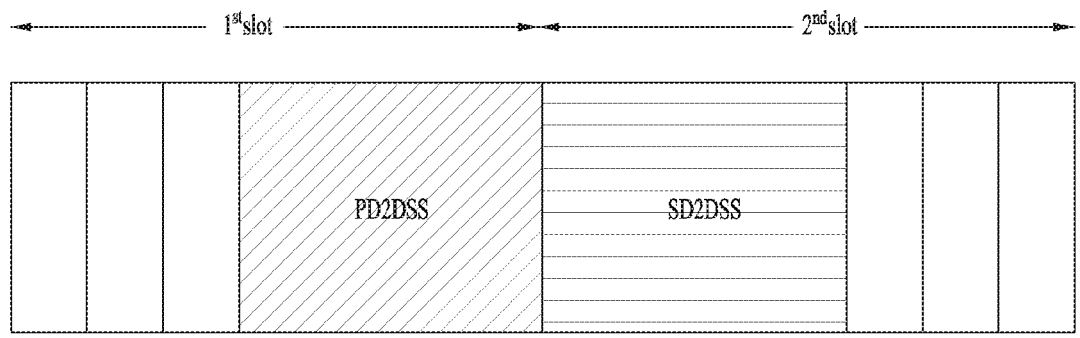
DM 2 / application 2
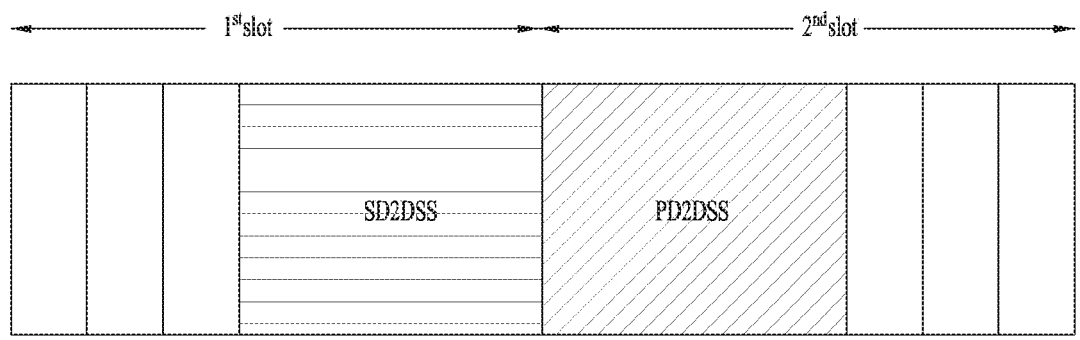

FIG.6
DM 1 /application 1
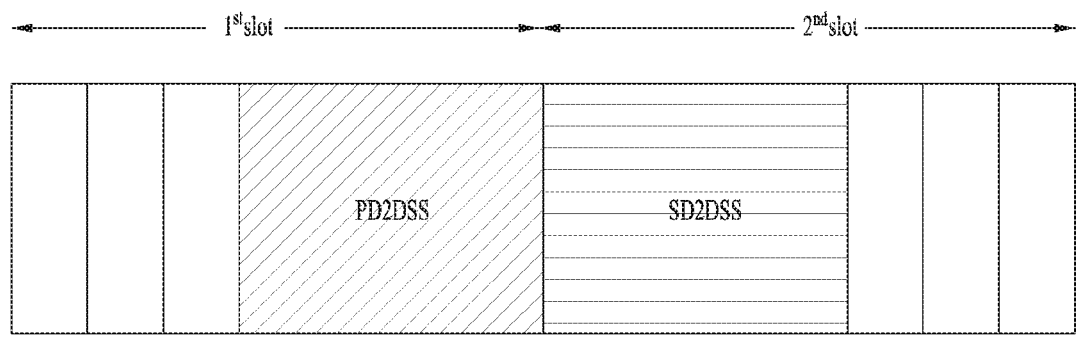
DM 2 /application 2
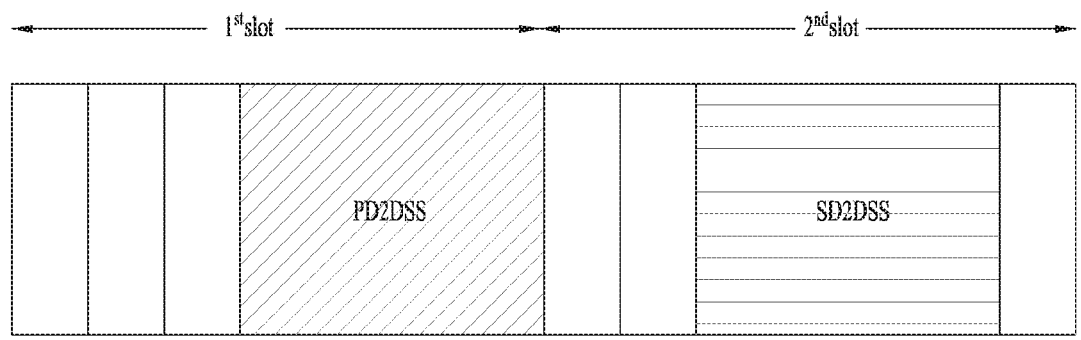

FIG. 7
DM 1 /application 1
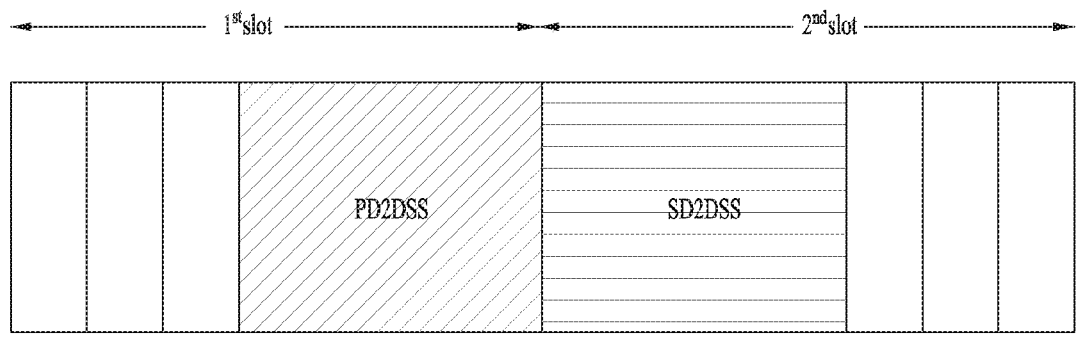
DM 2 /application 2
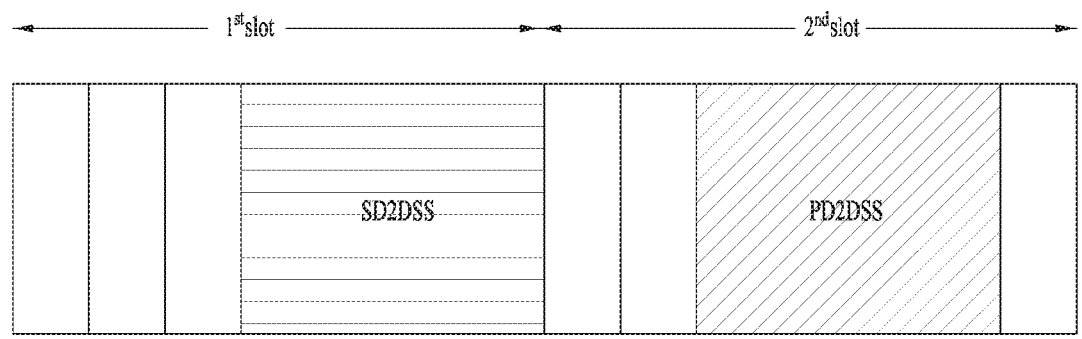

FIG. 8
DM 1 /application 1
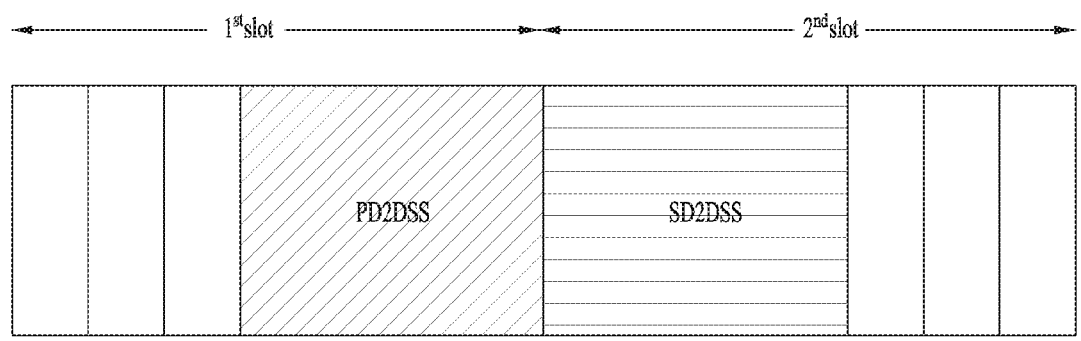
DM 2 /application 2
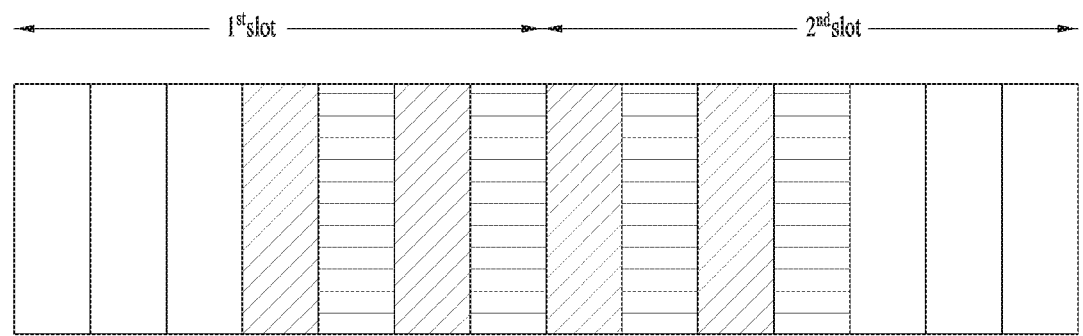

FIG. 9
DM 1 /application 1
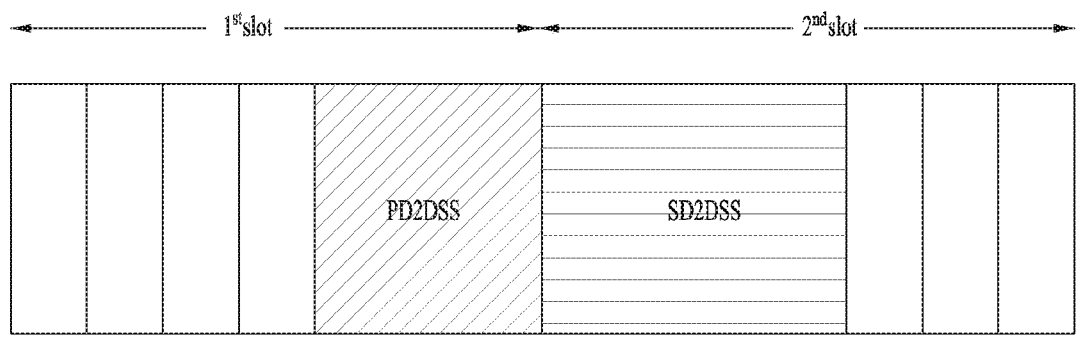
DM 2 /application 2
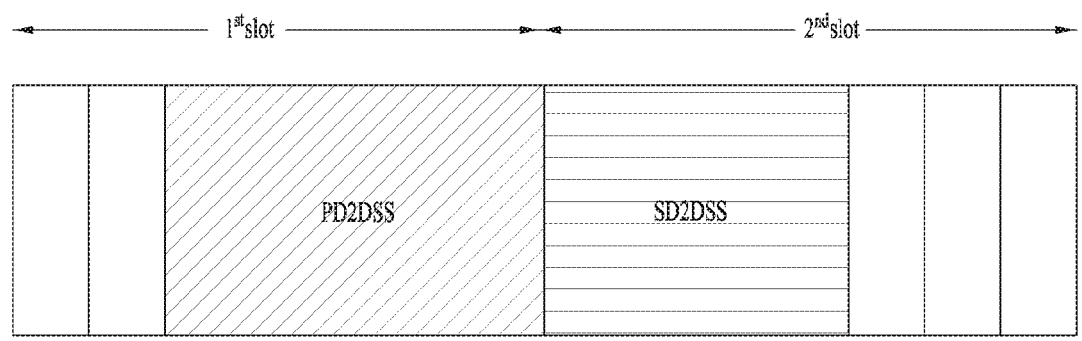

FIG. 10
DM 1 /application 1
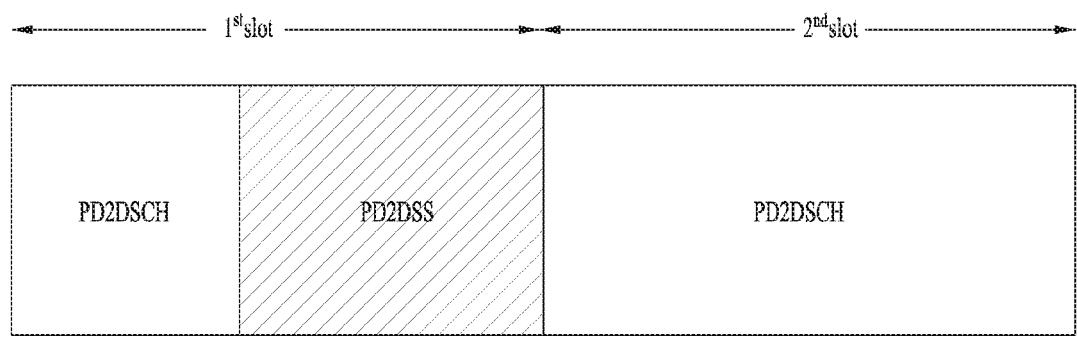
DM 2 /application 2
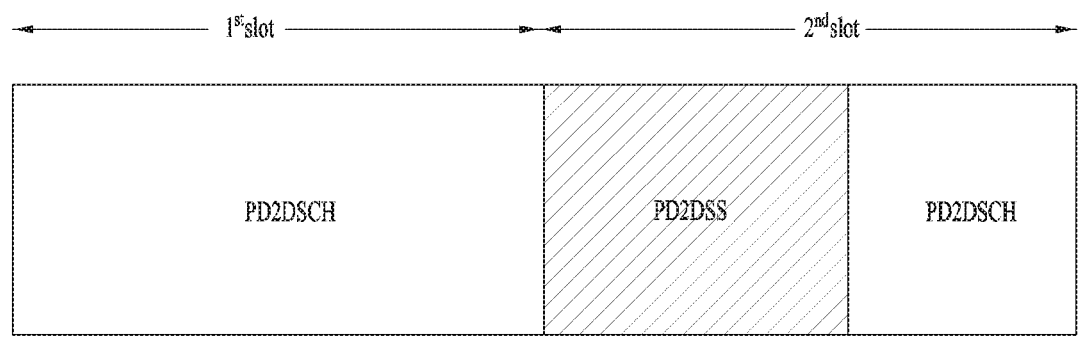

FIG. 11
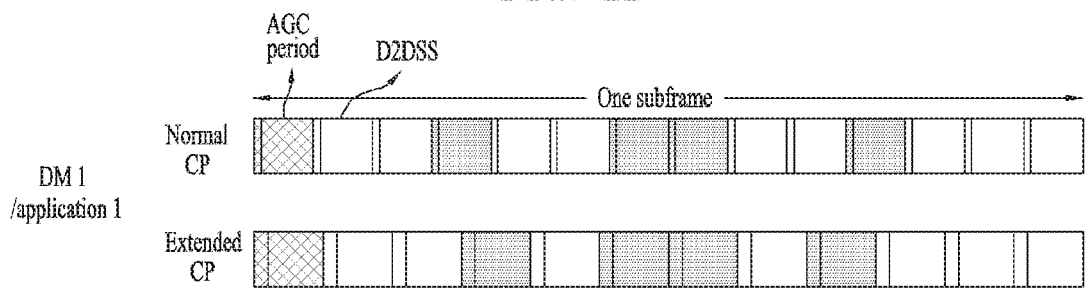
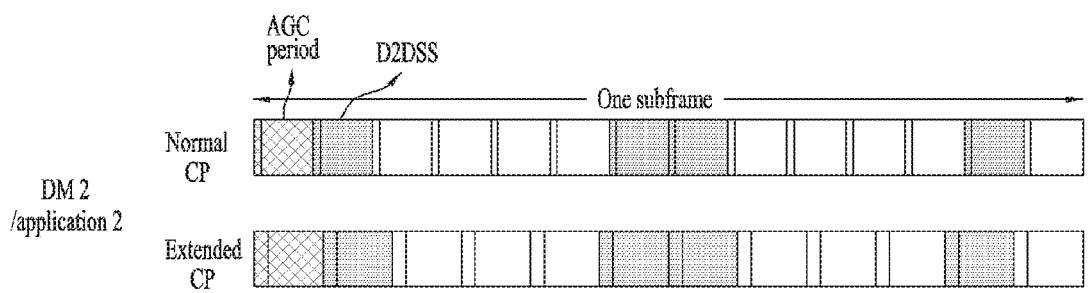

FIG. 12
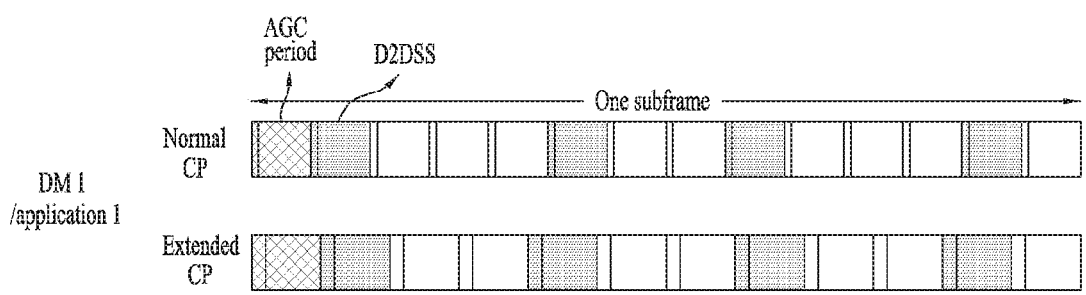
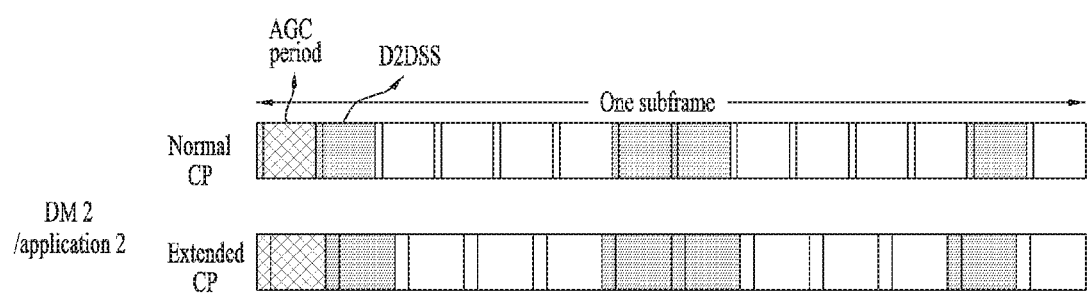

FIG. 14
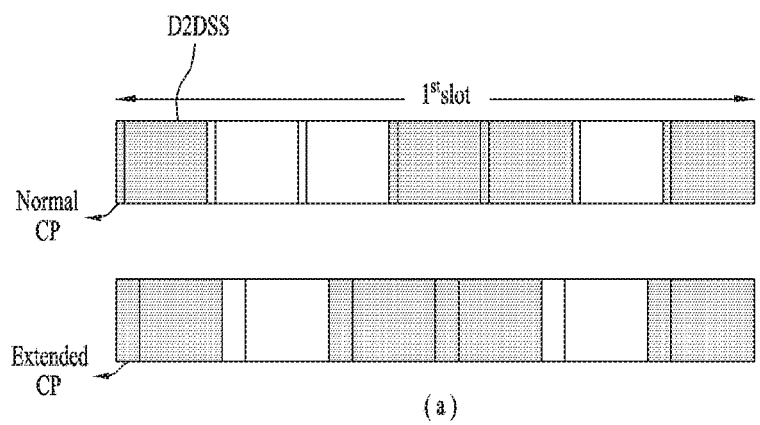
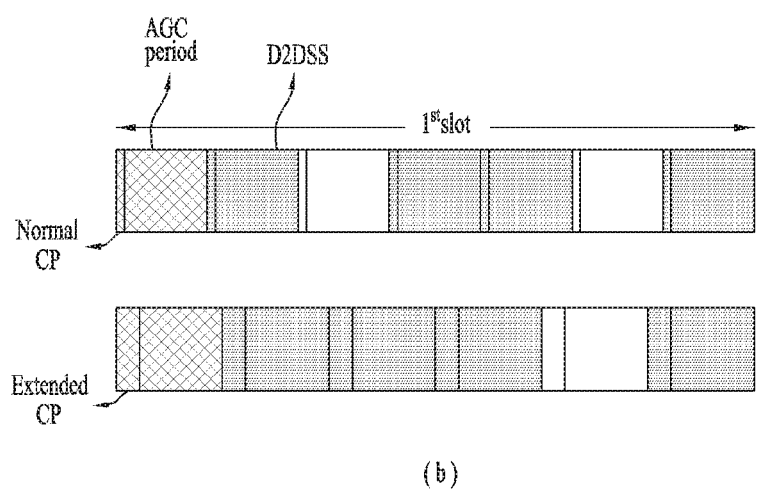

METHOD AND APPARATUS FOR ACQUIRING SYNCHRONIZATION BY DEVICE-TO-DEVICE TERMINAL IN WIRELESS COMMUNICATION SYSTEM

CROSS-REFERENCE TO RELATED APPLICATIONS

This application is the National Stage filing under 35 U.S.C. 371 of International Application No. PCT/KR2015/000785, filed on Jan. 26, 2015, which claims the benefit of U.S. Provisional Application No. 61/930,961, filed on Jan. 24, 2014 and 61/989,506, filed on May 6, 2014, the contents of which are all hereby incorporated by reference herein in their entirety.

TECHNICAL FIELD

The present invention relates to a wireless communication system, and more particularly, to a method and apparatus for acquiring synchronization in device-to-device communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to indicate an application type/duplex mode through a structure of symbols for transmitting a synchronization signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In a first technical aspect of the present invention, provided herein is a method of obtaining D2D (device-to-device) synchronization by a user equipment in a wireless communication system, including: receiving a subframe; and detecting a D2D synchronization signal including a first synchronization signal and a second synchronization signal from a plurality of OFDM (orthogonal frequency division multiplexing) symbols in the subframe. The user equipment may determine a type of an application associated with the D2D synchronization signal from a symbol structure formed by an OFDM symbol in which the first synchronization signal is transmitted and an OFDM symbol in which the second synchronization signal is transmitted.

In a second technical aspect of the present invention, provided herein is a D2D (device-to-device) user equipment for obtaining D2D synchronization in a wireless communication system, including: a receiving module; and a processor. The processor may be configured to detect a D2D synchronization signal including a first synchronization signal and a second synchronization signal from a plurality of OFDM (orthogonal frequency division multiplexing) symbols in a received subframe.

The user equipment may obtain information on an application associated with the D2D synchronization signal from a symbol structure formed by an OFDM symbol in which the first synchronization signal is transmitted and an OFDM symbol in which the second synchronization signal is transmitted.

All or some of the following items may be included in the first and second technical aspects of the present invention.

The type of the application may be indicated by the number of symbols from a slot boundary of the subframe to an OFDM symbol in which the D2D synchronization signal is transmitted.

The slot boundary may be determined based on two consecutive OFDM symbols.

The two consecutive OFDM symbols may be for D2D synchronization signals with the same sequence.

The detecting the D2D synchronization signal may include: detecting OFDM symbols with the same sequence on an OFDM symbol basis; detecting a slot boundary based on the detection result; estimating the number of symbols from the slot boundary to a symbol in which the D2D synchronization signal is transmitted; and determining the type of the application from the number of the symbols.

The user equipment may determine the type of the application from an order of arrangement of the OFDM symbol in which the first synchronization signal is transmitted and the OFDM symbol in which the second synchronization signal is transmitted.

The user equipment may determine the type of the application from the number of symbols from the OFDM symbol in which the first synchronization signal is transmitted to the OFDM symbol in which the second synchronization signal is transmitted.

If each of the first synchronization signal and the second synchronization signal is configured with a plurality of OFDM symbols, the user equipment may determine the type of the application according to whether the OFDM symbols configured for the each of the first synchronization signal and the second synchronization are consecutive.

The type of the application may be indicated by the number of symbols from a reference OFDM symbol in the subframe to an OFDM symbol from which a synchronization signal is detected.

The reference OFDM symbol may correspond to an OFDM symbol previously reserved for synchronization signal transmission in the subframe.

The detecting the D2D synchronization signal may include: detecting a synchronization signal from a reference OFDM symbol; if the synchronization signal is detected from the reference OFDM symbol, estimating the number of symbols from the reference OFDM symbol to a symbol in which the D2D synchronization signal is transmitted; and determining the type of the application from the number of the symbols.

The first synchronization signal may correspond to a PD2DSS (primary D2D synchronization signal) and the second synchronization signal may correspond to an SD2DSS (secondary D2D synchronization signal).

Advantageous Effects

According to the present invention, upon receiving a synchronization signal, a user equipment can obtain information on an application type/duplex mode rapidly and stably.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIGS. 5 to 12 are diagrams to explain indication of an application type through a symbol structure for synchronization signal transmission.

FIGS. 13 to 15 are diagrams to explain estimation of a cyclic prefix length through a structure for synchronization symbol transmission.

BEST MODE FOR INVENTION

Figure 1:
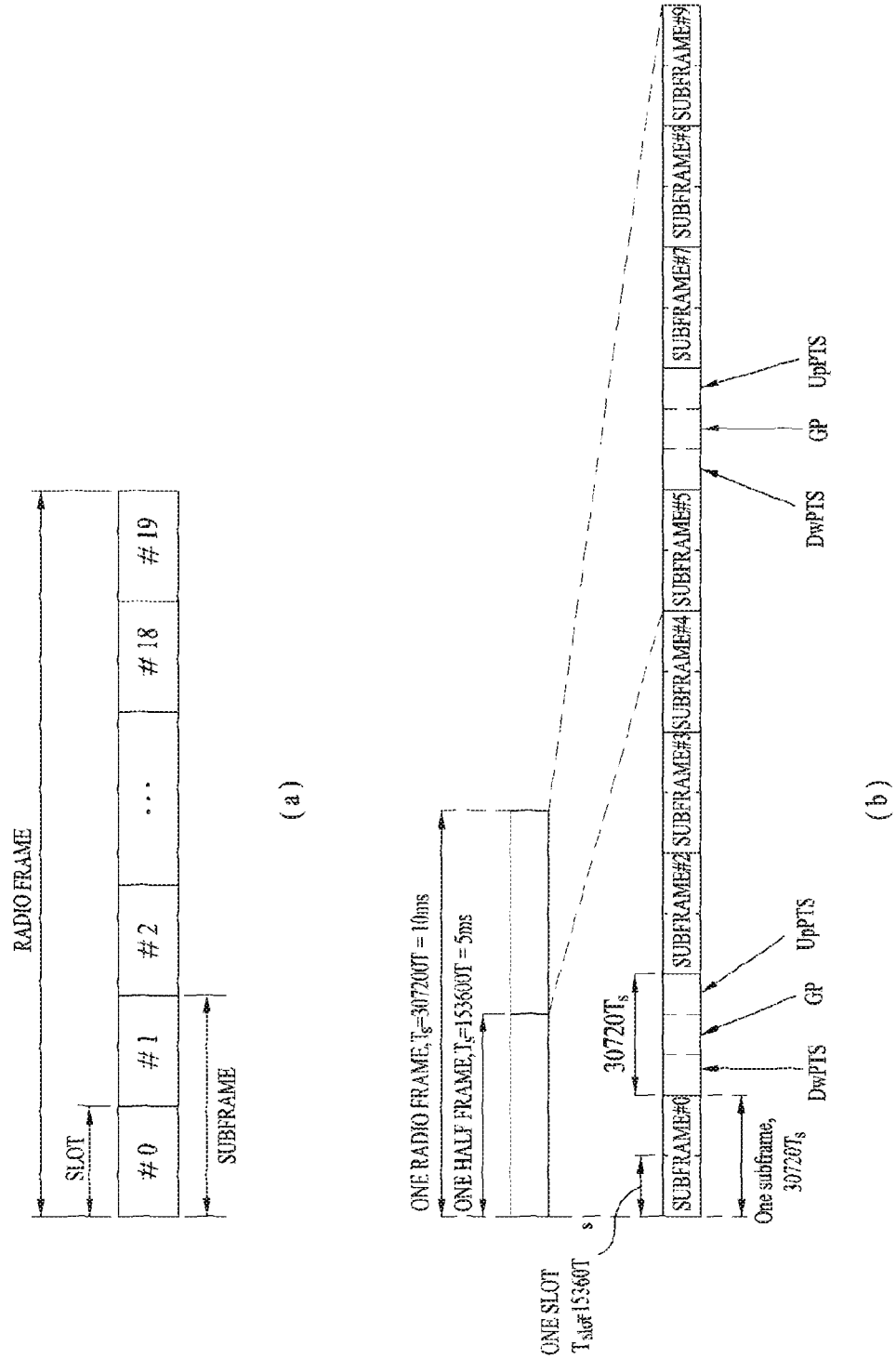
FIG. 1 is a diagram illustrating a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. In addition, in the following embodiments, the term "base station" may mean an apparatus such as a scheduling node or a cluster header. If the base station or the relay transmits a signal transmitted by a terminal, the base station or the relay may be regarded as a terminal.

The term "cell" may be understood as a base station (BS or eNB), a sector, a Remote Radio Head (RRH), a relay, etc. and may be a comprehensive term referring to any object capable of identifying a component carrier (CC) at a specific transmission/reception (Tx/Rx) point.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
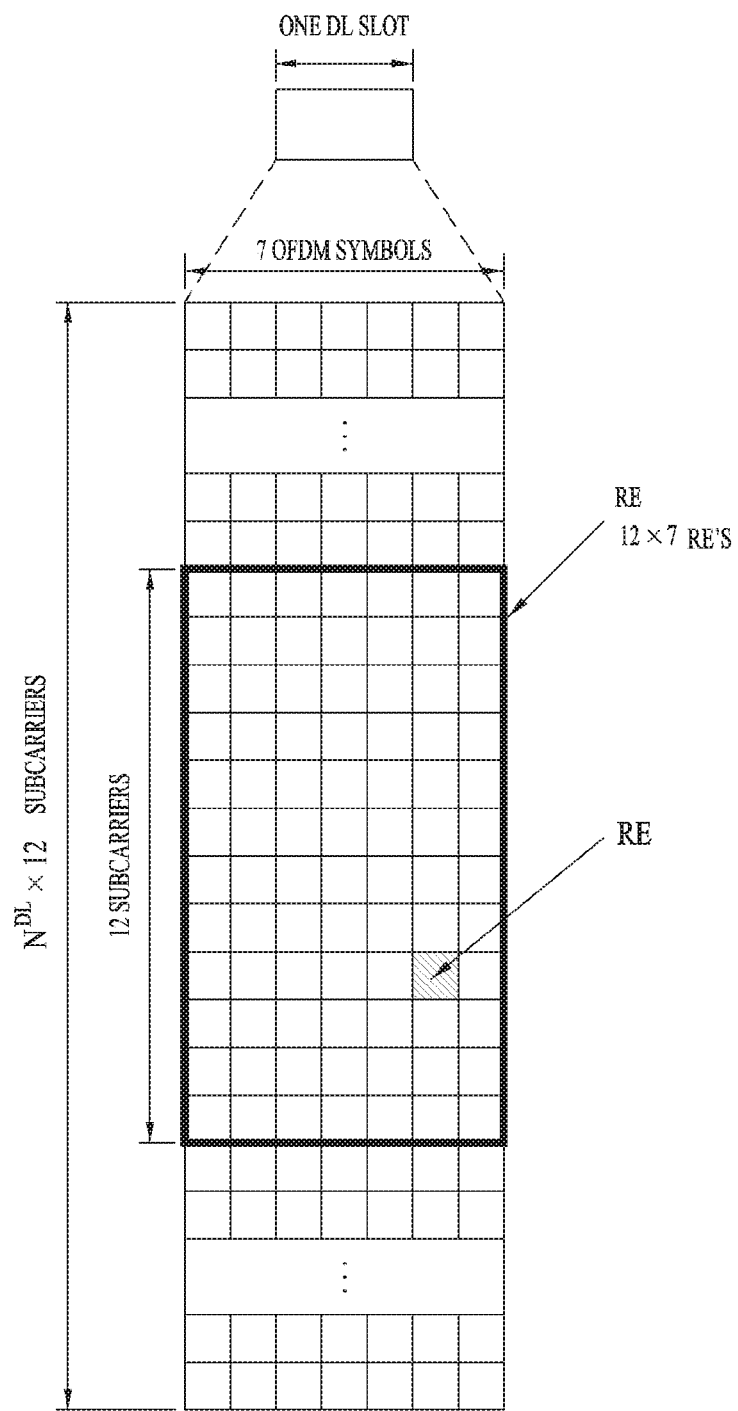
FIG. 2 is a diagram illustrating a resource grid of a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
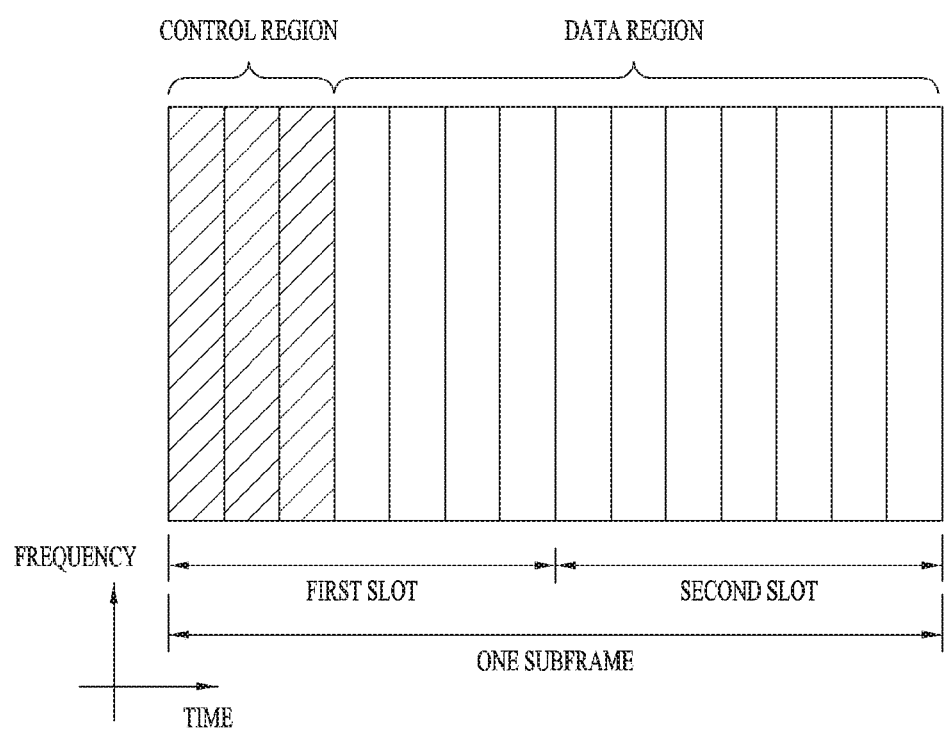
FIG. 3 is a diagram illustrating a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
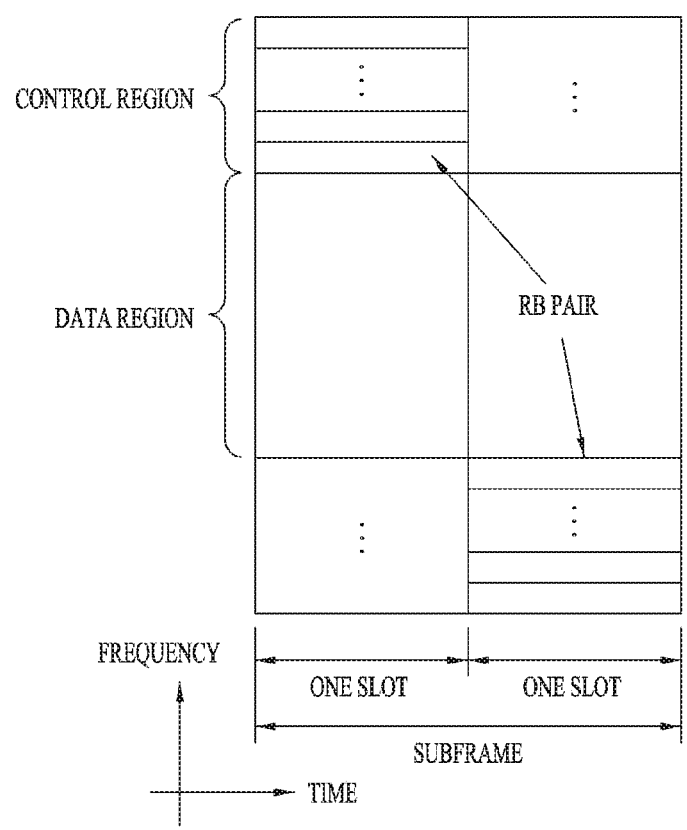
FIG. 4 is a diagram illustrating a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Synchronization Acquisition at D2D UE

Hereinafter, description will be given of acquisition of synchronization between UEs in D2D communication based on the above description and the legacy LTE/LTE-A system. In the OFDM system, if time/frequency synchronization is not matched, OFDM signals may not be multiplexed between different UEs due to inter-cell interference. Moreover, it is not efficient that all D2D UEs individually match synchronization by directly transmitting and receiving synchronization signals. Accordingly, in a distributed node system such as the D2D system, a specific node may transmit a representative synchronization signal and other UEs may match synchronization with reference to the representative synchronization signal. In other words, a scheme in which some nodes (here, the node may correspond to an eNB, UE or SRN (the SRN may be referred to as a synchronization reference node or a synchronization source)) transmit D2D synchronization signals (D2DSSs) and other UEs transceive signals by matching synchronization with reference to the D2D synchronization signals.

The D2DSS may be classified into PD2DSS (primary D2DSS) and SD2DSS (secondary D2DSS). The PD2DSS may have a form of a prescribed length of Zadoff-chu sequence or have a structure similar to/changed from/obtained by repeating that of PSS. The SD2DSS may have a form of M-sequence or have a structure similar to/changed from/obtained by repeating that of SSS. If UEs match synchronization with each other with reference to an eNB, the SRN is the eNB and the D2DSS is the PSS/SSS. A physical D2D synchronization channel (PD2DSCH) may mean a (broadcast) channel for carrying basic (system) information (e.g., D2DSS related information, duplex mode (DM), TDD UL/DL configuration, information on a resource pool, a type of an application associated with D2DSS, etc.) which a UE needs to know before transmitting and receiving a D2D signal. The PD2DSCH may be transmitted in the same subframe as the D2DSS. Alternatively, it may be transmitted in a next subframe.

The SRN may be a node for transmitting PD2DSCH or D2DSS. The D2DSS may be implemented in the form of a specific sequence and the PD2DSCH may have the form of a sequence representing specific information or the form of a codeword obtained through predetermined channel coding. Here, the SRN may be an eNB or a specific D2D UE. In the case of 'partial network coverage' or 'out of network coverage', a UE may be the SRN. In the case of 'inter-cell discovery', a UE may relay the D2DSS at a time obtained by adding prescribed offset to a timing at which UEs receive the D2DSS from the SRN in order to inform UEs in a neighboring cell of the timing. That is, the D2DSS may be relayed through multiple hops. If the D2DSS is relayed by a plurality of UEs or there are a plurality of clusters, a UE that intends to receive the D2DSS may observe several D2DSSs and receive D2DSSs with different hops.

As described above, information such as DM or a type of an application associated with D2DSS may be transmitted through PD2DSCH. However, in some cases, the DM, the type of the application associated with the D2DSS, a CP length, etc. need to be informed by other means except the PD2DSCH. For instance, in the case of the partial network coverage scenario, UEs located out of coverage may not know whether DM of an eNB operating in the vicinity is TDD or FDD. If the UEs out of the coverage indiscreetly perform D2D communication without knowing the DM, it may cause significant interference to reception of downlink signals at UEs in a cell boundary. In other words, the D2D UE should know the DM of the cell and the DM may be indicated by the PD2DSCH. However, in some cases, it may be difficult to receive the PD2DSCH (e.g., a case that PD2DSCH is not correctly decoded due to different PD2DSCHs transmitted through the same time resources). For this case, the DM can be indicated through a synchronization signal structure as described below. Moreover, as another embodiment, the type of the application associated with the D2DSS (here, the application may include public safety, a specific purpose of D2D communication, etc.) can be indicated by the synchronization signal structure. That is, each application may have a different D2DSS format and it will be described in detail below. In the following description, either application 1 or application 2 may indicate the public safety. In addition, DM 1 may indicate TDD and DM 2 may indicate FDD or vice versa.

Indication of Application Type/DM Through D2DSS Structure

If receiving a subframe in which D2DSS is transmitted, a UE may detect a first synchronization signal (it may be PD2DSS) and/or a second synchronization signal (it may be SD2DSS) from a plurality of OFDM symbols in the subframe. At the same time, the UE may determine a type of an application associated with the D2D synchronization signal based on a symbol structure formed by an OFDM symbol in which the first synchronization signal is transmitted and an OFDM symbol in which the second synchronization signal is transmitted.

Here, the symbol structure may mean an order of arrangement of the OFDM symbols for transmitting the first and second synchronization signals or a distance/the number of symbols between the OFDM symbols for transmitting the first and second synchronization signals. Alternatively, the symbols structure may means whether the OFDM symbols configured for the first and second synchronization signals are consecutive or not.

FIG. 5 illustrates an example of a scheme for indicating an application type/DM according to an arrangement order/locations of OFDM symbols in which a first synchronization signal and a second synchronization signal are transmitted. Referring to FIG. 5, when PD2DSS is arranged in front of SD2DSS on a time axis, it may indicate application 1/DM 1. On the contrary, when the SD2DSS is arranged in front of the PD2DSS, it may indicate application 2/DM 2. Alternatively, when OFDM symbols for PD2DSS transmission are arranged in front of OFDM symbols for SD2DSS transmission, it may indicate the application 1/DM 1. Otherwise, the application 2/DM 2 may be indicated. When the SD2DSS cannot be arranged completely in front or back of the PD2DSS (e.g., a case that the number of repetitions exceeds a slot length), a part of the SD2DSS (e.g., a case that SD2DSS is configured with a plurality of SSSs) may be located in front or back of the PD2DSS. In this case, the application type/DM can be identified using the amount of the partial SD2DSS located in front or back of the PD2DSS. Although it is assumed in the example that each of the PD2DSS and SD2DSS is configured with consecutive OFDM symbols, the above-described scheme can be applied to a case in which the PD2DSS and SD2DSS are configured by being interleaved with each other.

As another embodiment, the application type/DM may be determined according to the number of symbols between the OFDM symbol in which the first synchronization signal is transmitted and the OFDM symbol in which the second synchronization signal is transmitted. That is, a separation distance between the PD2DSS and SD2DSS may be configured differently. For instance, when the PD2DSS and SD2DSS are separated by N OFDM symbols from each other, it may indicate the application 1/DM 1. When the PD2DSS and SD2DSS are separated by M OFDM symbols from each other, it may indicate the application 2/DM 2. FIG. 6 shows an example of N=0 and M=2. In the case, the separation space may be occupied by other data including PD2DSCH or it may be configured as an empty space in which no signal is transmitted. In this embodiment, the order of arrangement of the PD2DSS and SD2DSS may be changed and the order may also be changed per application type/DM.

The methods described with reference to the examples in FIG. 5 and FIG. 6 can be used in combination thereof. For instance, as illustrated in FIG. 7, when the PD2DSS is arranged in front of the SD2DSS in the subframe and the separation distance between the PD2DSS and SD2DSS is 0, the application 1/DM 1 may be indicated. And, when the SD2DSS is arranged in front of the PD2DSS in the subframe and the separation distance between the PD2DSS and SD2DSS is 2, the application 2/DM 2 may be indicated. In the example of FIG. 7, the order of arrangement of the PD2DSS and SD2DSS may be changed and the order may also be changed per application type/DM.

As another embodiment, the application type/DM may be determined according to whether the OFDM symbols configured for the first and second synchronization signals are consecutive. Alternatively, the application type/DM may be determined according to whether the PD2DSS and SD2DSS are interleaved (in each symbol or in part). For example, referring to FIG. 8, when the OFDM symbols that configure the PD2DSS and SD2DSS are connected/consecutive, the application 1/DM 1 may be indicated. And, when the OFDM symbols that configure the PD2DSS and SD2DSS are interleaved, the application 2/DM 2 may be indicated. In the example of FIG. 8, the order of arrangement of the PD2DSS and SD2DSS may be changed and the order may also be changed per application type/DM.

As a further embodiment, depending on the application type/DM, a repetition number of the first synchronization signal and/or the second synchronization signal may be configured differently. In the case of FDD, time synchronization may not be correctly matched between cells. That is, if D2D communication is performed in the FDD, an uncertain region in the time domain may be large compared to that of a TDD cell. Thus, D2DSS in a FDD cell may have a repetition number/length different from that of D2DSS in the TDD cell. For instance, as illustrated in FIG. 9, in the application 1/DM 1, a length (i.e., the number of OFDM symbols)/repetition number of the PD2DSS may be set smaller than a length/repetition number of the SD2DSS. And, in the application 2/DM 2, the length/repetition number of the PD2DSS may be set greater than the length/repetition number of the SD2DSS.

FIG. 10 shows an example of D2DSS composed of only PD2DSS. In this case, the application type/DM may be determined based on a location relationship between PD2DSS and PD2DSCH. For instance, as shown in FIG. 10, in the application 1/DM 1, the PD2DSS may be assigned from a last symbol of a slot (boundary) and the PD2DSCH may be assigned to the remaining region. In the application 2/DM 2, the PD2DSS may be assigned from a location separated by N symbols from a slot boundary and the PD2DSCH may be assigned to the remaining region. In this case, if there is a separate reference signal for decoding the PD2DSCH, the application type/DM may also be identified based on a location relationship between the reference signal and PD2DSS.

As a further embodiment, the application type/DM may be indicated through a location relationship between symbols in which D2DSSs are transmitted. For instance, the DM may be identified according to a location for transmitting $n^{th}$ D2DSS and a location for transmitting $(n+1)^{th}$ D2DSS. FIGS. 11 and 12 shows examples of the above embodiment.

Referring to FIG. 11, the application type may be indicated by the number of symbols from a slot boundary of a subframe to an OFDM symbol in which a D2D synchronization signal is transmitted. Here, the slot boundary may be determined based on two consecutive OFDM symbols and the two consecutive OFDM symbols may be for D2D synchronization signals with the same sequence. That is, depending on the application type/DM, transmission locations for remaining D2DSSs may be configured differently with reference to the continuously transmitted D2DSSs. Particularly, as illustrated in FIG. 11, although N symbols are continuously transmitted in a subframe, the D2DSS is transmitted from a location separated by three symbols from the slot boundary in the case of the application 1/DM 1 and the D2DSS is transmitted from a location separated by five symbols from the slot boundary in the case of the application 2/DM 2 (normal CP). In this case, the continuously transmitted D2DSSs may be distinctively configured with the same root sequence of Zadoff-chu sequences in order to enable a symbol level search. That is, a D2DSS receiving UE detects locations of N consecutive D2DSSs through the symbol level search and then performs additional detection to figure out how far the (N−M) remaining symbols are located from the locations of the corresponding symbols. Thereafter, the D2DSS receiving UE can determine the application type/DM. In other words, after receiving the subframe configured as shown in FIG. 11, the UE may detect OFDM symbols that use the same sequence on an OFDM symbol basis and then detect the slot boundary based on the detection result. Thereafter, the UE may estimate the number of the symbols from the slot boundary to the symbol in which the D2D synchronization signal is transmitted and then determine the application type based on the number of the symbols.

FIG. 12 shows an example of indicating the application type/DM through the number of symbols from a reference OFDM symbol to an OFDM symbol in which a synchronization signal is detected within a subframe. Here, the reference OFDM symbol may mean an OFDM symbol previously reserved for transmission of the synchronization signal in the subframe. Particularly, referring to FIG. 12, when the D2DSS is transmitted from a location separated by three symbols from the reference OFDM symbol (e.g., a second OFDM symbol of the subframe and/or a second OFDM symbol from the end of the subframe), the application 1/DM 1 may be indicated. And, when the D2DSS is transmitted from a location separated by four symbols from the reference OFDM symbol, the application 2/DM 2 may be indicated. In general, in case that D2DSS is transmitted through N symbols in one subframe, M symbols may be transmitted in the same location irrespective of the application type/DM and the (N−M) remaining symbols may be transmitted in different locations depending on the application type/DM. That is, if partial symbols are transmitted in the same locations irrespective the application type/DM, the UE may detect a reference time. In addition, if locations of the remaining symbols are configured differently and thus distances from the reference time are set different, the UE may identified the application type/DM.

Estimation of CP Length Through D2DSS Structure

If PD2DSS and/or SD2DSS are configured in the repetitive form of PSS and/or SSS, either the PD2DSS or the SD2DSS may be configured in the repetitive form without CP insertion. In this case, the PD2DSS and SD2DSS may have different structures. For instance, the PD2DSS may be configured by consecutive PSSs without CP for the purpose of enabling the symbol level search. On the other hand, the SD2DSS may include the CP in order to identify IDs or search for a frequency offset after PD2DSS detection. In this case, a length of the CP may be estimated based on the separation distance between the PD2DSS and SD2DSS.

Figure 13:
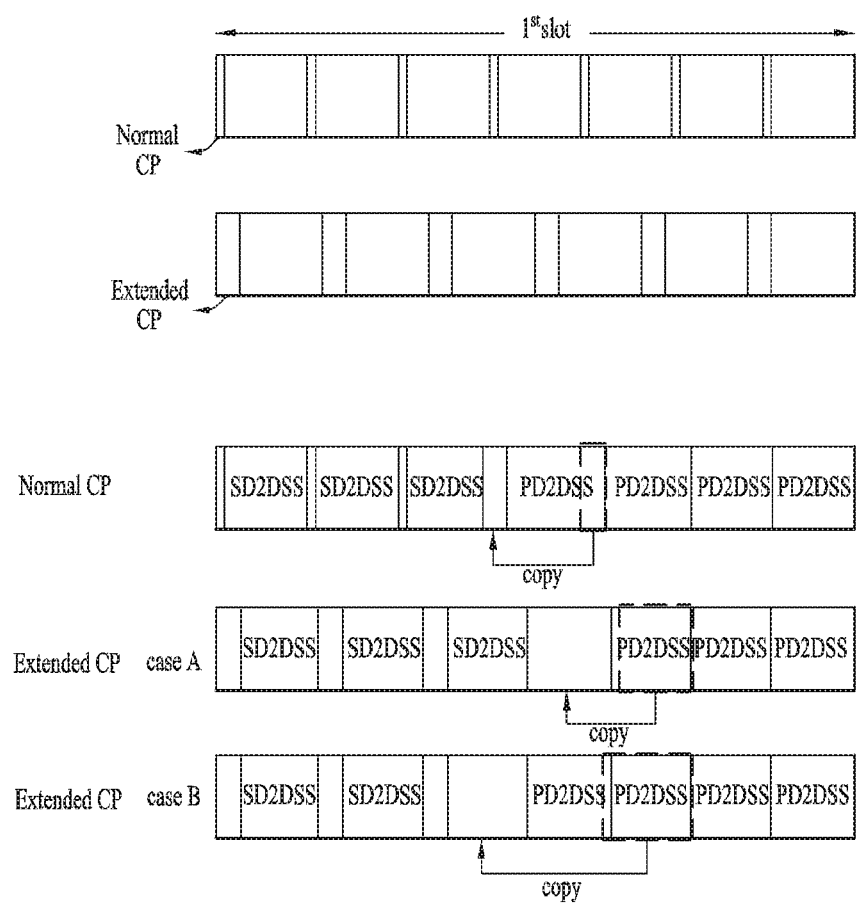

FIG. 13 shows an embodiment with respect to the CP length estimation. Referring to FIG. 13, in case of normal CP, the PD2DSS and SD2DSS are separated by four times the CP length. In case of extended CP, the PD2DSS and SD2DSS are separated by three times the CP length (Extended CP Case A) or four times the CP length (Extended CP Case B). In the Extended CP Case B, since a distance corresponding to four times the CP length exceeds one symbol length, a region copied by the CP may exceed one PD2DSS length. Since the number of PD2DSSs in the case of the normal CP is different from that in the case of the extended CP, a UE may first detect three PD2DSSs and then additionally detect the remaining PD2DSS according to the CP length. When receiving such a structure of the D2DSS, the UE may estimate a slot boundary by detecting the PD2DSS and then know whether there is the SD2DSS located as much as the CP length away. By doing so, the UE may estimate the CP length.

Meanwhile, the PD2DSS or SD2DSS may not be located consecutively. For instance, some symbols may be inconsecutively arranged for the purpose of improving frequency offset estimation performance. Particularly, in case of the PD2DSS configured with N symbols, M symbols may be located consecutively and the (N−M) remaining symbols may be located inconsecutively. Alternatively, N PD2DSSs or N SD2DSS may be transmitted in predetermined locations of symbols. In this case, a symbol separation distance between $n^{th}$ D2DSS and $(n+1)^{th}$ D2DSS may be configured differently depending on the CP length. Alternatively, symbol locations for D2DSS transmission may be configured differently depending on the CP length. FIG. 14(a) shows a location of D2DSS in each of the normal CP and extended CP when the D2DSS is transmitted through four symbols. In the case of the normal CP, a first D2DSS and a second D2DSS are separated by an interval of two symbols. On the other hand, in the case of the extended CP, a first D2DSS and a second D2DSS are separated by an interval of one symbol.

In this case, either the PD2DSCH or SD2DSS may be transmitted in the interval between the D2DSSs. That is, if the separation distance between specific D2DSSs is configured differently or the symbol locations for the D2DSS transmission are configured differently as described above, the D2DSS receiving UE can estimate the CP length in a procedure for detecting the D2DSS. FIG. 14(b) shows an embodiment of estimating a CP length based on D2DSS arrangement when a first symbol is used as an AGC period. In the case of the normal CP, the first symbol and a second D2DSS symbol are separated by one symbol. On the other hand, in the case of the extended CP, the first symbol and a second D2DSS symbol are not separated.

Figure 15:
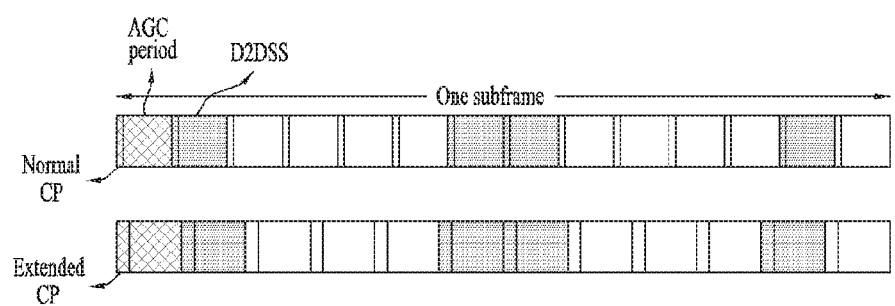

FIG. 15 shows an embodiment of transmitting D2DSS and PD2DSCH in one subframe. It is assumed in FIG. 15 that a first symbol is used as AGC. Referring to FIG. 15, first D2DSS and second D2DSS are separated by four OFDM symbols in the case of the normal CP and first D2DSS and second D2DSS are separated by three OFDM symbols in the case of the extended CP.

Meanwhile, the number of symbols occupied by the PD2DSS or SD2DSS may be changed according to the CP length. For instance, in the case of the normal CP, the number of symbols occupied by the PD2DSS and the number of symbols occupied by the SD2DSS may be M_p_n and M_s_n, respectively. In the case of the extended CP, the number of symbols occupied by the PD2DSS and the number of symbols occupied by the SD2DSS may be M_p_e and M_s_e, respectively. Such a configuration may be adopted when the D2DSS is transmitted together with the PD2DSCH. For instance, assuming that N OFDM symbols are always used for the PD2DSCH regardless of the CP length to maintain a PD2DSCH coding rate, in the case of the extended CP, the number of the symbols occupied by the D2DSS may be decreased since the rest of symbols are used for the D2DSS. In this case, the CP may be included in only the SD2DSS except the PD2DSS. Further, the PD2DSS and SD2DSS may be arranged according to any one of the aforementioned embodiments.

The above embodiment can be used together with the method of indicating an application type/DM through a D2DSS structure. For instance, the separation distance between the PD2DSS and SD2DSS may indicate the CP length and the arrangement order of the PD2DSS and SD2DSS may indicate the application type/DM.

The aforementioned embodiments can be applied to a case in which the SD2DSS is not transmitted. In this case, the SD2DSS may be replaced with PD2DSS with a root sequence different from that of the aforementioned PD2DSS. For example, in the above sentence of 'the UE may determine a type of an application associated with the D2D synchronization signal based on a symbol structure formed by an OFDM symbol in which the first synchronization signal is transmitted and an OFDM symbol in which the second synchronization signal is transmitted.', the first synchronization signal and the second synchronization signal may be replaced with a first root sequence of PD2DSS and a second root sequence of PD2DSS, respectively.

The above-mentioned method is based on the assumption of PD2DSCH transmission. However, in case that the PD2DSCH is not transmitted, the D2DSS may be transmitted in a slot, a first symbol in each slot may be used for AGC, and a last symbol may be set as a Tx/Rx switching gap. In this case, five symbols may be configured in the case of the normal CP and four symbols may be configured in the case of the extended CP. That is, the DM may be indicated by differently configuring a root sequence of the D2DSS and the CP length may be indicated through the number of transmitted D2DSS symbols. For instance, when the number of symbols that configure the D2DSS is five, it may indicate the normal CP. And, when the number of symbols that configure the D2DSS is four, it may indicate the extended CP. In addition, the application type/DM may be indicated through the root sequence of the D2DSS.

Meanwhile, when UEs out of coverage fail to discover an eNB or D2DSS relayed by an eNB in the vicinity, the UEs cannot obtain initial information. However, the UEs may transmit synchronization signals by becoming an independent synchronization head. In this case, a rule may be defined such that the UEs transmit D2DSS for specific DM and CP length as a default. In this case, a rule may be defined such that when D2D UEs, which intend to receive the D2DSS, fail to discover D2DSS transmitted or relayed by a different cell in the vicinity, the D2D UEs performs an operation of receiving the specific DM of the D2DSS as a default. In this case, the CP length and DM may be transmitted according to the pre-configured mode. Alternatively, when there is an access log indicating a recent access to a network, the D2DSS may be transmitted based on the recently used CP length and DM. For instance, although a UE out of coverage may be preconfigured to transmit D2DSS with extended CP in FDD at all times, the UE may be configured to transmit D2DSS with normal CP/TDD only if a cell, which the UE access last, is based on TDD and normal CP.

Meanwhile, if a specific UE observes several DMs or several CP types of D2DSSs at the same time, that is, if a specific eNB in the vicinity is a TDD cell and a different eNB is a FDD cell, D2DSSs transmitted by UEs associated with the two individual cells may have different formats. Assuming that there is a UE that observes all of the transmitted D2DSSs, a rule may be defined such that the UE perform tracking by selecting a specific DM of D2DSS first. For instance, D2DSS used in the FDD may be first tracked. The reason for this is that the FDD cell is highly likely to have a wide coverage and thus the FDD cell is highly likely to have more associated D2D UEs. Alternatively, if the UE needs to perform tacking on D2DSS with highest signal strength among the D2DSSs observed in the vicinity and then relay the D2DSS, a rule may be defined such that the UE perform transmission based on the same format as that of the tracked D2DSS. For instance, in case that several types of D2DSSs are observed, if D2DSS with normal CP/FDD among the D2DSSs has the highest signal strength, the D2DSS is relayed. As another embodiment, D2DSS transmitted by an eNB may be tracked first. In this case, whether the D2DSS is transmitted from an eNB or a specific synchronization head UE may be included in PD2DSCH. Alternatively, a receiving UE may deduce it from a structure or a period of the D2DSS. In this case, a rule may be defined such that the D2DSS is relayed based on the same DM and/or CP as that of the received D2DSS.

Meanwhile, the proposed method for identifying application/DM/CP length according to a D2DSS structure can be utilized as a method of indicating a D2DSS period. For instance, in case of direct communication between vehicles, since UE's moving speed is significantly high, D2DSS needs to be transmitted in a short period. Thus, a method of modifying usage of D2DSS (e.g., a synchronization signal for securing high mobility) according to a D2DSS structure and a method of changing a D2DSS structure according to a D2DSS transmission period can be utilized.

Device Configuration According to Embodiments of the Present Invention

Figure 16:
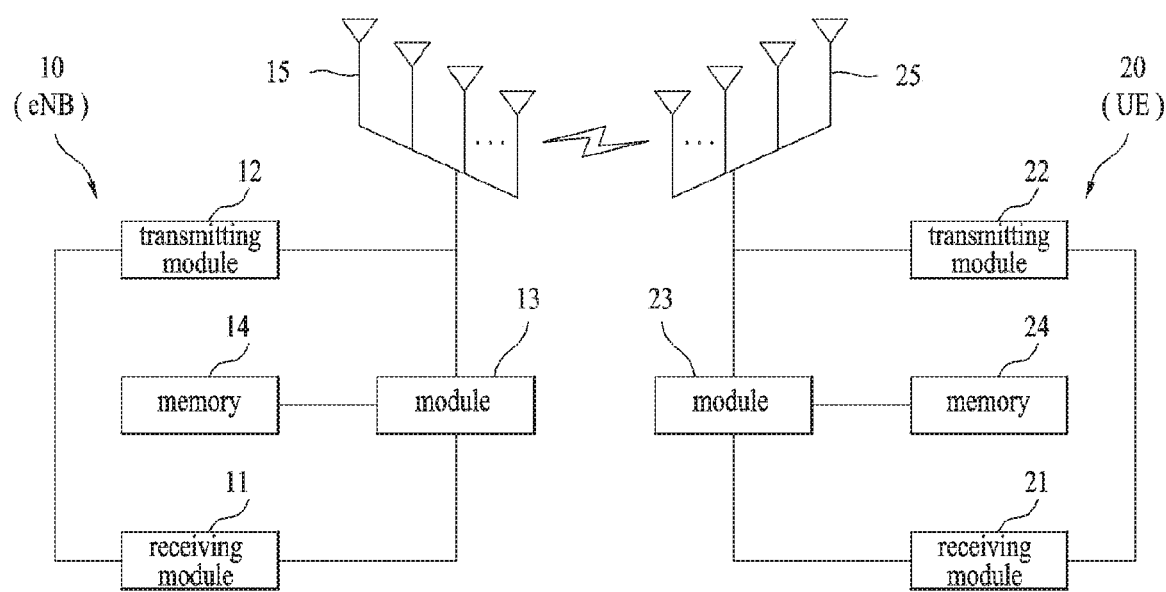
FIG. 16 is a block diagram illustrating configurations of transmitting and receiving devices.

FIG. 16 is a diagram illustrating configurations of a transmission point device and a user equipment device according to embodiments of the present invention.

Referring to FIG. 16, a transmission point device 10 according to the present invention may include a receiving module 11, a transmitting module 12, a processor 13, a memory 14 and a plurality of antennas 15. The plurality of the antennas 15 may mean that the transmission point device supports MIMO transmission and reception. The receiving module 11 can receive various signals, data and information in uplink from a user equipment. The transmitting module 12 can transmit various signals, data and information in downlink to the user equipment. And, the processor 13 can control overall operations of the transmission point device 10.

The processor 13 of the transmission point device 10 according to one embodiment of the present invention can handle the details required in each of the embodiments mentioned in the foregoing description.

The processor 13 of the transmission point device 10 performs functions of operating and processing information received by the transmission point device 10, information to be externally transmitted by the transmission point device 10, and the like. The memory 14 can store the operated and processed information and the like for a prescribed period and can be substituted with such a component as a buffer (not shown in the drawing) and the like.

Referring to FIG. 16, a user equipment device 20 according to the present invention may include a receiving module 21, a transmitting module 22, a processor 23, a memory 24 and a plurality of antennas 25. The plurality of the antennas 15 may mean that the transmission point device supports MIMO transmission and reception. The receiving module 21 can receive various signals, data and information in downlink from an eNB. The transmitting module 22 can transmit various signals, data and information in uplink to the eNB. And, the processor 23 can control overall operations of the user equipment device 20.

The processor 23 of the user equipment device 20 according to one embodiment of the present invention can handle the details required in each of the embodiments mentioned in the foregoing description.

The processor 23 of the user equipment device 20 performs functions of operating and processing information received by the user equipment device 20, information to be externally transmitted by the user equipment device 20, and the like. The memory 24 can store the operated and processed information and the like for a prescribed period and can be substituted with such a component as a buffer (not shown in the drawing) and the like.

The detailed configurations of the transmission point device 10 and the user equipment device 20 can be implemented such that the details explained with reference to various embodiments of the present invention are independently applied or two or more embodiments of the present invention are simultaneously applied. And, redundant description shall be omitted for clarity.

The description of the transmission point device 10 in FIG. 16 may be equally applied to a relay node device as a downlink transmission entity or an uplink reception entity. And, the description of the user equipment device 20 in FIG. 16 may be equally applied to a relay node device as a downlink reception entity or an uplink transmission entity.

The embodiments of the present invention mentioned in the foregoing description can be implemented using various means. For instance, the embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. The software code is stored in a memory unit and can be driven by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The above-described embodiments of the present invention can be applied to various kinds of mobile communication systems.

What is claimed is:

1. A method of obtaining D2D (device-to-device) synchronization by a user equipment in a wireless communication system, the method performed by the user equipment and comprising:
   receiving a subframe; and
   detecting a D2D synchronization signal comprising a first synchronization signal and a second synchronization signal from a plurality of OFDM (orthogonal frequency division multiplexing) symbols in the subframe,
   wherein the user equipment determines a type of an application associated with the D2D synchronization signal from a symbol structure formed by an OFDM symbol in which the first synchronization signal is transmitted and an OFDM symbol in which the second synchronization signal is transmitted.

2. The method of claim 1, wherein the type of the application is indicated by the number of symbols from a slot boundary of the subframe to an OFDM symbol in which the D2D synchronization signal is transmitted.

3. The method of claim 2, wherein the slot boundary is determined based on two consecutive OFDM symbols.

4. The method of claim 3, wherein the two consecutive OFDM symbols are for D2D synchronization signals with the same sequence.

5. The method of claim 1, the detecting the D2D synchronization signal comprising:
   detecting OFDM symbols with the same sequence on an OFDM symbol basis;
   detecting a slot boundary based on the detection result;
   estimating the number of symbols from the slot boundary to a symbol in which the D2D synchronization signal is transmitted; and
   determining the type of the application from the number of the symbols.

6. The method of claim 1, wherein the user equipment determines the type of the application from an order of arrangement of the OFDM symbol in which the first synchronization signal is transmitted and the OFDM symbol in which the second synchronization signal is transmitted.

7. The method of claim 1, wherein the user equipment determines the type of the application from the number of symbols from the OFDM symbol in which the first synchronization signal is transmitted to the OFDM symbol in which the second synchronization signal is transmitted.

8. The method of claim 1, wherein if each of the first synchronization signal and the second synchronization signal is configured with a plurality of OFDM symbols, the user equipment determines the type of the application according to whether the OFDM symbols configured for the each of the first synchronization signal and the second synchronization are consecutive.

9. The method of claim 1, wherein the type of the application is indicated by the number of symbols from a reference OFDM symbol in the subframe to an OFDM symbol from which a synchronization signal is detected.

10. The method of claim 9, wherein the reference OFDM symbol corresponds to an OFDM symbol previously reserved for synchronization signal transmission in the subframe.

11. The method of claim 1, the detecting the D2D synchronization signal comprising:
   detecting a synchronization signal from a reference OFDM symbol;
   if the synchronization signal is detected from the reference OFDM symbol, estimating the number of symbols from the reference OFDM symbol to a symbol in which the D2D synchronization signal is transmitted; and
   determining the type of the application from the number of the symbols.

12. The method of claim 1, wherein the first synchronization signal corresponds to a PD2DSS (primary D2D synchronization signal) and the second synchronization signal corresponds to an SD2DSS (secondary D2D synchronization signal).

13. A D2D (device-to-device) user equipment for obtaining D2D synchronization in a wireless communication system, the D2D user equipment comprising:
a receiving module; and
a processor,
wherein the processor is configured to detect a D2D synchronization signal comprising a first synchronization signal and a second synchronization signal from a plurality of OFDM (orthogonal frequency division multiplexing) symbols in a received subframe and
wherein the user equipment obtains information on an application associated with the D2D synchronization signal from a symbol structure formed by an OFDM symbol in which the first synchronization signal is transmitted and an OFDM symbol in which the second synchronization signal is transmitted.

* * * * *